(12) United States Patent
Krupp et al.

(10) Patent No.: US 8,123,878 B1
(45) Date of Patent: Feb. 28, 2012

(54) GAS GENERATING SYSTEM

(75) Inventors: Robert M. Krupp, Rochester, MI (US); Brian A. Mayville, Troy, MI (US)

(73) Assignee: TK Holdings, Inc., Armada, MI (US)

( * ) Notice: Subject to any disclaimer, the term of this patent is extended or adjusted under 35 U.S.C. 154(b) by 416 days.

(21) Appl. No.: 12/156,611

(22) Filed: Jun. 2, 2008

Related U.S. Application Data

(60) Provisional application No. 60/932,570, filed on May 31, 2007.

(51) Int. Cl.
 *C06B 45/00* (2006.01)
 *D03D 23/00* (2006.01)
 *D03D 43/00* (2006.01)

(52) U.S. Cl. .... 149/2; 149/108.4; 149/108.8; 149/109.4

(58) Field of Classification Search ................... 149/23, 149/2, 108.4, 108.8, 109.4
 See application file for complete search history.

(56) References Cited

U.S. PATENT DOCUMENTS 3,810,655 A 5/1974 Prachar .................. 280/150
(Continued)

OTHER PUBLICATIONS

Office Action U.S. Appl. No. 12/217,646, filed Jul. 7, 2008 Mailed on Sep. 29, 2009 (185).

*Primary Examiner* — James McDonough
(74) *Attorney, Agent, or Firm* — L.C. Begin & Associates, PLLC

(57) ABSTRACT

A gas generating system includes a gas generant material for generating gases upon combustion thereof, and an amount of liquid coolant for cooling the generated gases.

14 Claims, 5 Drawing Sheets

U.S. PATENT DOCUMENTS

| | | | |
|---|---|---|---|
| 4,494,963 A | 1/1985 | Reich | 48/69 |
| 5,487,561 A | 1/1996 | Mandzy et al. | 280/741 |
| 5,649,720 A | 7/1997 | Rink et al. | 280/737 |
| 5,806,886 A | 9/1998 | Ittel et al. | 280/741 |
| 6,051,158 A | 4/2000 | Taylor et al. | 252/67 |
| 6,076,468 A | 6/2000 | DiGiacomo et al. | 102/530 |
| 6,196,583 B1 * | 3/2001 | Ruckdeschel et al. | 280/736 |
| 6,231,702 B1 | 5/2001 | Blomquist | 149/36 |
| 6,932,383 B2 | 8/2005 | Flamm | 280/737 |
| 7,073,820 B2 | 7/2006 | McCormick | 280/741 |
| 7,134,690 B2 | 11/2006 | Furusawa et al. | 280/736 |
| 7,178,831 B2 | 2/2007 | Yoshida et al. | 280/741 |
| 7,588,265 B2 * | 9/2009 | Blackburn | 280/737 |
| 7,597,354 B2 * | 10/2009 | Blackburn | 280/737 |
| 7,857,345 B1 * | 12/2010 | Stevens | 280/736 |
| 2006/0131003 A1 * | 6/2006 | Chang et al. | 165/104.33 |
| 2008/0093053 A1 * | 4/2008 | Song et al. | 165/80.3 |

* cited by examiner

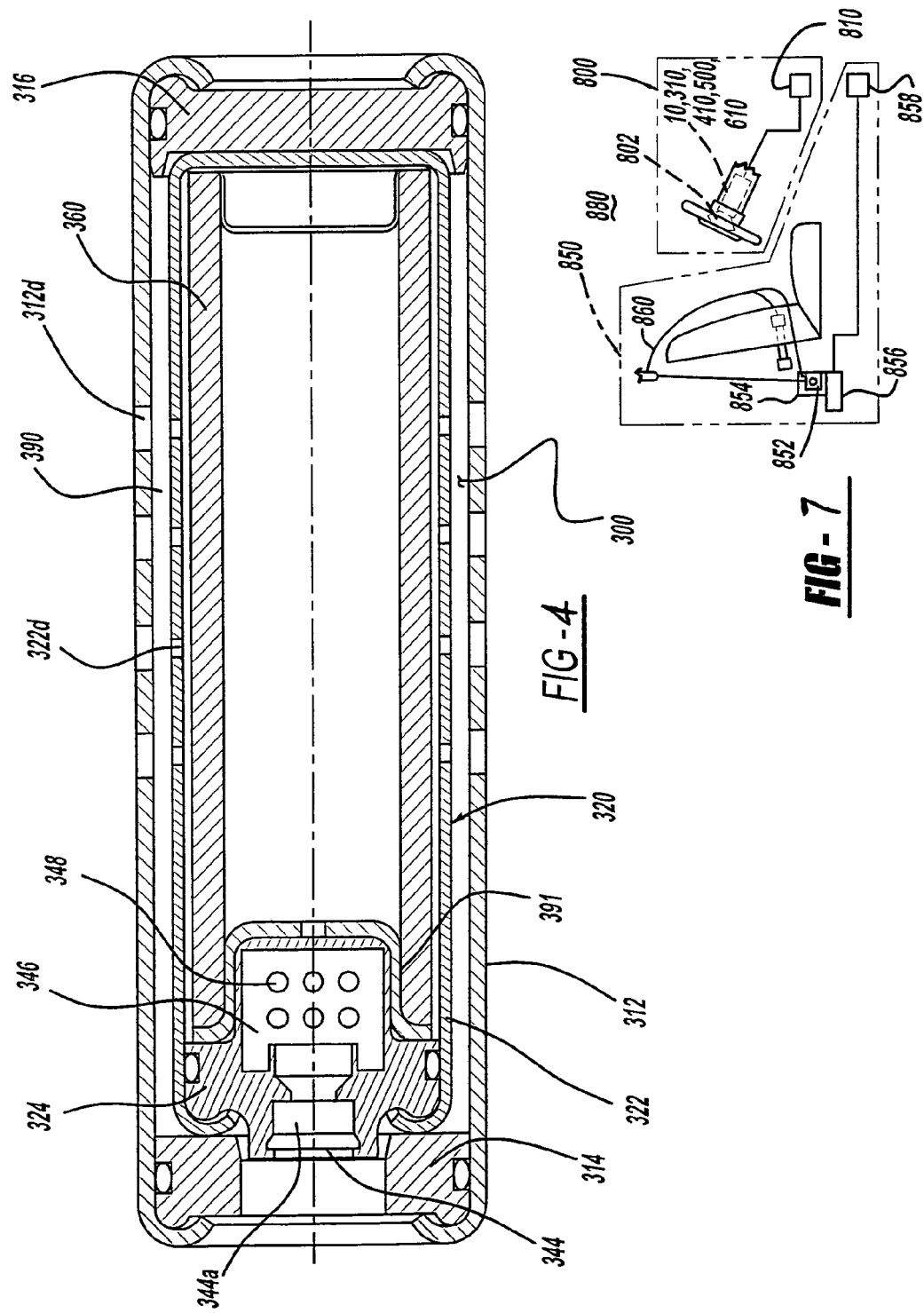

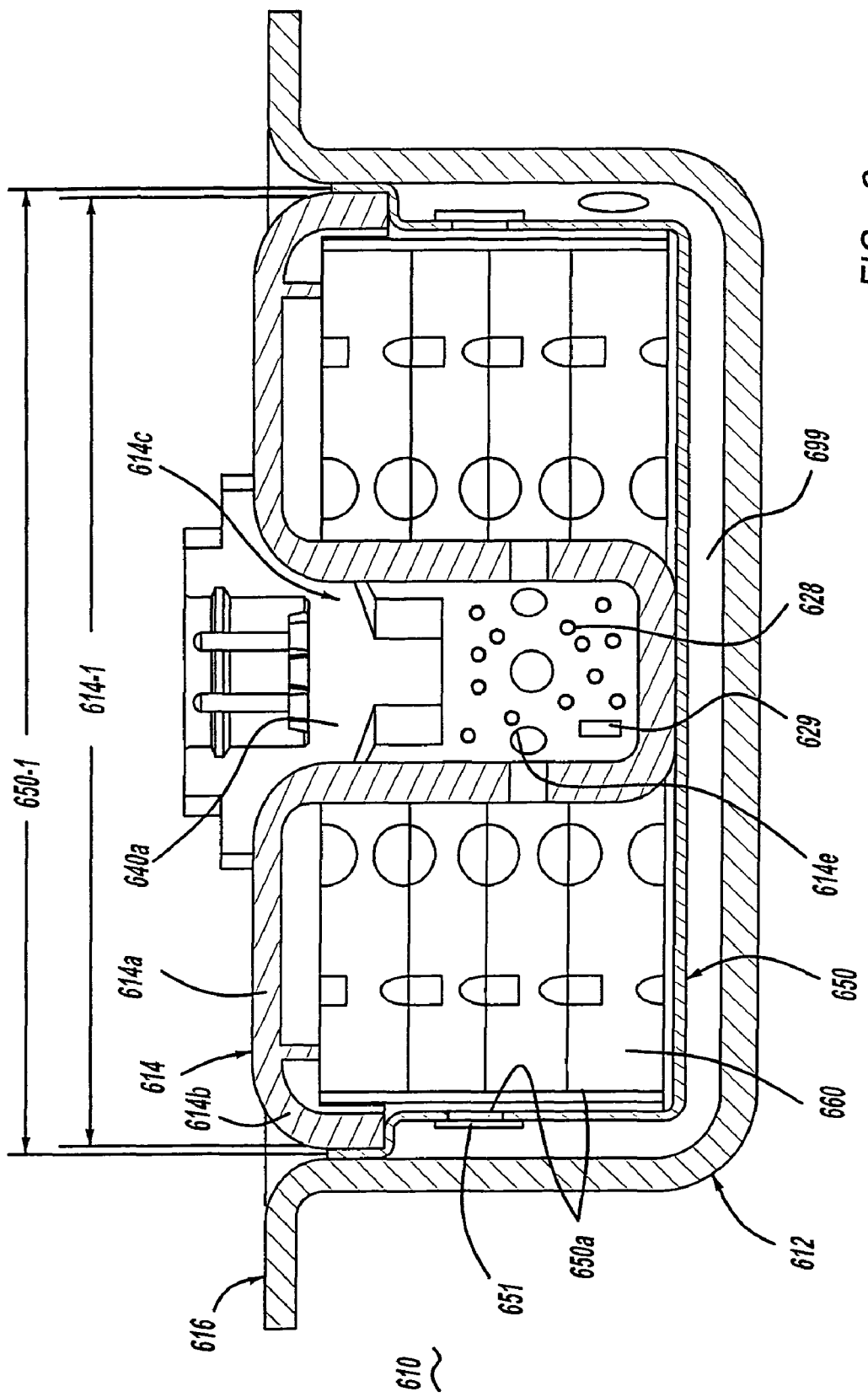

US 8,123,878 B1

GAS GENERATING SYSTEM

CROSS REFERENCE TO RELATED APPLICATIONS

This application claims the benefit of provisional application Ser. No. 60/932,570, filed on May 31, 2007.

BACKGROUND OF THE INVENTION

The present invention relates to gas generating systems for generating pressurized gases used to inflate one or more inflatable devices.

BRIEF DESCRIPTION OF THE DRAWINGS

FIG. 3 is a cross-sectional side view of a gas generating system in accordance with another embodiment of the present invention.

FIG. 4 is a cross-sectional side view of a gas generating system in accordance with another embodiment of the present invention.

FIG. 6 is a cross-sectional side view of a gas generating system in accordance with a another embodiment of the present invention.

FIG. 7 is a schematic representation of an exemplary vehicle occupant restraint system incorporating a gas generating system in accordance with an embodiment of the present invention.

DETAILED DESCRIPTION

Figure 1:
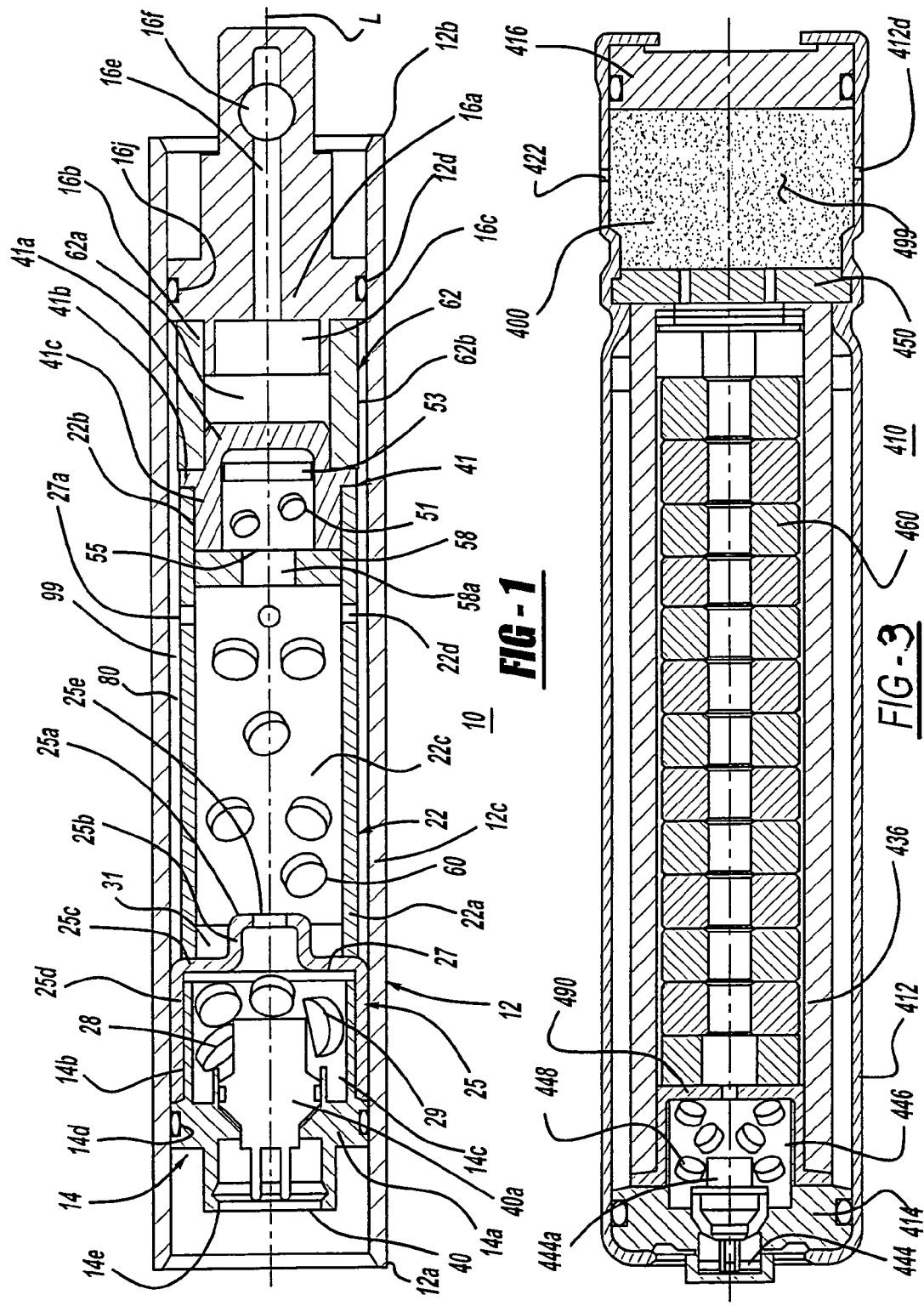
FIG. 1 is a cross-sectional side view of a gas generating system in accordance with a first embodiment of the present invention.

FIG. 1 shows a gas generating system 10 incorporating a liquid coolant, in accordance with a first embodiment of the present invention.

Gas generating system 10 includes a substantially cylindrical outer housing 12 having a pair of opposed ends 12a, 12b and a wall 12c extending between the ends to define a housing interior cavity. A longitudinal axis L extends along the length of the housing. Housing 12 may be extruded, roll-formed, or otherwise fabricated from a metal, metal, alloy, or any other suitable material.

A first end closure 14 is secured to end 12a of housing 12, using one or more known methods, such as crimping or welding. End closure 14 has formed therein a base portion 14a, a wall 14b extending from the base portion, a cavity 14d formed along a periphery of base portion 14a, and a central orifice 14e extending through base portion 14a. Wall 14b and base portion 14a define a cavity 14c in which a quantity of a known booster material 28 (described below) is positioned. An O-ring or other resilient seal 22 is positioned in peripheral cavity 14d to provide a substantially gas-tight seal along the interface between end closure 14 and housing wall 12c. End closure 14 may be stamped, cast, machined, or otherwise formed from carbon steel, stainless steel, or any other suitable material.

Referring to FIG. 1, an igniter assembly 40 containing an igniter 40a is positioned and secured within end closure central orifice 14e so as to enable fluid communication between the igniter and booster material 28 positioned in end closure cavity 14c. Igniter assembly 40 may be secured in central orifice 14e using any one of several known methods, for example, by welding, crimping, using an interference fit, or by adhesive application. Igniter assemblies suitable for the application described herein may be obtained from any of a variety of known sources, for example Primex Technologies, Inc. of Redmond, Wash. or Aerospace Propulsion Products bv, of The Netherlands. Igniter 40a may be formed as known in the art. Exemplary igniter constructions are described in U.S. Pat. Nos. 6,009,809 and 5,934,705, incorporated herein by reference. Igniter 40a may be secured within igniter assembly 40 by any one of a variety of methods, for instance using welds, adhesives, by crimping, or by integrally molding the igniter into a portion of the igniter assembly.

A first booster cup 25 is positioned over first end closure wall 14b to cover cavity 14c and retain booster material 28 therein. First booster cup 25 has a first base portion 25a, a generally cylindrical first wall 25b extending from the base portion, a second base portion 25c extending from first wall 25b, and a generally cylindrical second wall 25d extending from the second base portion, thereby defining a cavity for positioning a booster material therein. First booster cup 25 serves as a combustion chamber for booster material 28 (described below). Second wall 25d is open and is dimensioned to receive first end closure wall 14b therein. First base portion has an orifice 25e formed therein to enable fluid communication between end closure cavity 14c and an exterior of the booster cup after activation of the gas generating system. This fluid communication enables transfer of booster material combustion products therethrough into an inner housing 22 (described below) for use in igniting gas generant 60. First booster cup 25 may be stamped, cast, drawn, or otherwise formed from carbon steel, stainless steel, or any other suitable material.

Referring to FIG. 1, a quantity of a known booster material 28 is positioned within end closure cavity 14c. Activation of igniter 40a produces combustion of the booster material, producing ignition of gas generant composition 60 in a manner known in the art.

A quantity of a known heat-activated auto-ignition material 29 may be positioned within the gas generating system so as to enable fluid communication between the auto-ignition material and an associated gas generant material 60 and/or an associated booster material 28 upon activation of the gas generating system. In the embodiment shown in FIG. 1, auto-ignition material 29 is positioned within end closure cavity 14c, in fluid communication with booster material 28. Auto-ignition material 29 is a pyrotechnic material which is ignited by exposure to a temperature lower than the ignition temperature of gas generant 60. As is known in the art, auto-ignition material 29 is ignited by heat transmitted from an exterior of housing 12 to the interior of the housing due to an elevated external temperature condition (produced, for example, by a fire). Combustion of auto-ignition material 29 results in combustion of gas generant 60, either directly or through intervening combustion of booster material 28. Suitable auto ignition materials are known to those skilled in the art. Examples of suitable auto-ignition materials are nitro-cellulose based compositions and gun powder.

Booster cup orifice 25e may be covered with a rupturable, gas-tight seal or shim 27 to seal the orifice. Various known disks, foils, films, or tapes (for example, aluminum or stainless steel shims, foil or tape) may be used to form the seal. The seal material is typically adhered to an interior surface of the cup through the use of an adhesive. Alternatively, other materials or methods may be used to seal orifice 25e.

An orifice plate 31 engages inner housing 22 in a substantially gas-tight fit and also engages first booster cup first wall 25b. Alternatively, the orifice plate may be omitted and the booster cup 25 configured to engage inner housing 22 directly.

An inner housing 22 is inwardly radially spaced from outer housing 12 and is substantially coaxially oriented along longitudinal axis L of the outer housing. Inner housing 22 has an elongate, substantially cylindrical body defining a first end 22a, a second end 22b, and a first chamber or interior cavity 22c for containing therein gas generant material 60 (described below). Interior cavity 22c serves as a combustion chamber for the gas generant 60. Inner housing 22 forms an interference fit with or otherwise engages orifice plate 31 in a substantially gas-tight fit at housing first end 22a. Inner housing 22 also forms an interference fit with or otherwise engages a second booster cup 41 (described below) in a substantially gas-tight fit at second end 22b. Inner housing 22 has a plurality of spaced-apart gas exit apertures 22d extending thereal-ong to enable fluid communication between the interior cavity of the inner housing and an exterior of the inner housing. Each of apertures 22d is covered with a rupturable, gas-tight seal or shim 27a to seal the aperture. Inner housing 22 may be extruded, roll-formed, or otherwise suitably formed from carbon steel, stainless steel, or another suitable material.

Referring again to FIG. 1, a quantity of a propellant or gas generant material 60 is contained within interior cavity 22c for production of gases when ignited by igniter booster material combustion products. Gas generant 60 may be in any of a variety of forms, for example tablets, stacked wafers, or in granulated form. Gas generant material 60 may be formulated by known methods, and in one embodiment is exemplified by "smokeless" gas generant compositions as described in U.S. Pat. Nos. 5,872,329, 6,074,502, 6,287,400, 6,306,232 and 6,475,312 incorporated by reference herein. As used herein, the term "smokeless" should be generally understood to mean such propellants as are capable of combustion yielding at least about 90% gaseous products based on a total product mass; and, as a corollary, no more than about 10% solid products based on a total product mass. However, the present invention is not limited to the use of smokeless gas generant compositions therein.

Referring again to FIG. 1, a cushion or pad 58 is positioned within inner housing 22 proximate the inner housing second end. Pad 58 aids in holding the gas generant material in place and in cushioning the gas generant against vibration and impact. Pad 58 has an opening 58a formed therein to enable fluid communication between inner housing interior cavity 22c and a cavity formed in second booster cup 41 and containing a booster material 51. Pad 58 may be formed from, for example, a ceramic fiber material.

Pad opening 58a may be covered with a rupturable, gas-tight seal or shim 55 to seal the orifice. Various known disks, foils, films, or tapes (for example, aluminum or stainless steel shims, foil or tape) may be used to form the seal. The seal material is typically adhered to a surface of the pad through the use of an adhesive. Alternatively, other materials or methods may be used to seal orifice 58a.

Second booster cup 41 engages inner housing second end 22b in a substantially gas-tight fit. Second booster cup 41 is generally cylindrical and has a base portion 41a, a circumferential flange 41b extending from the base portion, and a wall 41c extending from flange 41b to define a cavity in which booster material 51 and auto-ignition material 53 are positioned. The booster material and auto-ignition material placed in second booster cup 41 may be the same as or different from the booster material and auto-ignition material placed in first booster cup 25. Second booster cup 41 may be stamped, cast, drawn, or otherwise formed from carbon steel, stainless steel, or any other suitable material.

A filter 62 is positioned within housing 12 for filtering particulates from gases generated by combustion of gas generant 60. Filter 62 is generally cylindrical and includes a central portion 62a and a circumferential portion 62b enclosing the central portion. The relative lengths of the central and circumferential portions are specified such that central portion 62a is recessed within circumferential portion 62b to form a cavity for receiving second booster cup base portion 41a therein in a snug fit. The filter may be formed from any of a variety of materials (for example, a carbon fiber or metallic mesh or perforated sheet, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J.

A second end closure 16 is secured to outer housing second end 12b, using one or more known methods, such as crimping or welding. End closure 16 has a longitudinal base portion 16a, a wall 16b extending from the base portion to define a cavity 16c, and a nozzle 16d extending from the base portion and containing a central gas flow passage 16e extending through and along a length of the nozzle. Passage 16e receives generated gases and vapor passing through filter 62 and channels the gases and vapor to one or more openings 16f in second end closure for distributing gases to an exterior of the gas generating system. A peripheral cavity 16j is formed along a periphery of base portion 16a, and an O-ring or other resilient seal 22 is positioned in cavity 16j to provide a substantially gas-tight seal along the interface between second end closure 16 and housing wall 12c. End closure 16 may be stamped, cast, machined, or otherwise formed from carbon steel, stainless steel, or any other suitable material.

The above-described engagement between orifice plate 31 (or first booster cup 25), inner housing 22, second booster cup 41, filter 62, and second end closure 16 aids in positioning and securing these elements within the outer housing. In addition, as seen in FIG. 1, a generally annular cavity 80 is formed between outer housing 12 and the previously described elements positioned within the outer housing.

All of the embodiments of the gas generating system disclosed herein incorporate an aqueous liquid coolant, generally designated 99, for cooling gases generated by combustion of gas generant material 60. It has been found that if desired, with selection of an appropriate coolant, the heat resulting from combustion of the gas generant can be used to evaporate at least a portion of the coolant, for providing an additional amount of fluid for inflating or actuating a gas-actuated device. It has also been found that this additional inflation fluid aids in achieving and sustaining a pressurized condition in the gas-actuated device. It has also been found that the coolant media can also serve as a filtration medium to aid in removing particulates from the generated gases.

Coolant 99 is a liquid substance which is capable of cooling the generated gases to the desired degree, and which (if desired) is vaporizable upon exposure to the generated gases and other combustion products, to provide an additional volume of inflation fluid according to the needs of a particular application. The composition of the liquid coolant and the amount of coolant can be selected based on one or more factors pertinent to a particular application, such as the amount of gas generated by combustion of the gas generant, the total amount of gas needed to inflate the inflatable device, effluent quality, the volume of liquid storage space available in the housing, the amount of additional gas moles desired from vaporization of the liquid for filling the inflatable device, the specific heat of the liquid, the amount of heat the liquid needs to absorb from gases in order to cool the gases to a predetermined temperature, the desired final temperature of the gas entering the inflatable device, the temperature of the gases entering the coolant, the amount of gas generated by combustion of the gas generant, booster compound, and auto-ignition compound, and other pertinent factors, according to the requirements of a particular application.

Due to the relatively high specific heat and relatively low cost of water, mixtures containing water are generally inexpensive and efficient alternatives for use in cooling the generated gases, especially over an extended time period. However, other suitable types and compositions of liquid media are also contemplated.

Examples of suitable coolant mixtures are salt solutions, such as solutions containing metal salts. An aqueous salt solution is desired relative to reducing the freezing point of the coolant whereby the particular concentration of the aqueous salt solution may be varied depending on the freezing point of the respective coolant and the solids that would be contained upon vaporization of the associated water. Exemplary coolants include saline solutions containing alkali metal and alkaline earth metal formates, acetates, chlorides, and mixtures thereof. Other exemplary coolants include aqueous solutions of potassium formate, propylene glycol, potassium acetate, and mixtures thereof. The aqueous coolant/solution may contain a concentration of salt from 0.0 wt % to about 75% of salt, and more preferably from 0.0 wt % to about 60 wt %, and even more preferably from about 0.0 wt % to about 55 wt %. In a particular embodiment, the coolant comprises a potassium acetate solution having about 50% by weight of potassium acetate, about 49% by weight of water, and about 1% by weight of a suitable rust inhibitor. In another particular embodiment, the coolant comprises a potassium formate solution having about 50% by weight of potassium formate and about 49% by weight of water. The saline solutions may be prepared by dissolving the appropriate amount of salt in distilled water and stirring. Or, various saline solutions/coolants may be purchased from companies such as Orison in Abilene, Tex. under the trade name of RDF-1, or from Dynelene, Inc. of Whitehall, Pa.

In a particular embodiment, the liquid coolant has a freezing point of less than −40° C.

In another particular embodiment, the coolant has a boiling point of greater than 107° C.

In another particular embodiment, the coolant is a non-combustible substance or mixture.

In yet another particular embodiment, the coolant is a substance or mixture that does not form toxic by-products when evaporated or when mixed with by-products formed by the combustion of the gas generant material used in the gas generating system.

Coolant 99 is generally positioned along a gas flow path extending between the gas generating system combustion chamber and gas exit apertures enabling fluid communication between the interior of the gas generating system and an exterior of the system, so that generated gases pass through the coolant as they transit between the combustion chamber and the gas exit apertures. The coolant may be positioned at any suitable location along the flow path of the gases, depending on the space available within the housing, the viscosity and composition of the coolant medium, and other factors relating to the requirements of a particular application.

Coolant 99 may be permitted to occupy any or all spaces in the interior of housing 12 that is exterior of inner housing 22, that is accessible to the flow of the liquid coolant within the outer housing, and that is not otherwise occupied by another component of the gas generating system. Depending on the structure of filter 62, the viscosity of the coolant, and other factors, coolant may occupy channels or cavities formed in the filter structure. Alternatively, as exemplified in the embodiments shown in FIGS. (described below), coolant may be confined within a dedicated enclosure or other specified portion of the system interior located along a flow path of gases between the combustion chamber and the gas exit apertures.

An amount of liquid coolant may be inserted into the outer housing sufficient to occupy substantially all of the space accessible to the coolant, or a lesser amount of coolant may be provided, thereby leaving space within the outer housing for the coolant to shift position according to forces (such as gravity or inertial forces resulting from vehicle movement) exerted on the gas generating system.

Operation of the embodiment of the gas generating system shown in FIG. 1 will now be discussed.

Upon receipt of a signal from a crash sensor, an electrical activation signal is sent to igniter 40a, which ignites to initiate combustion of booster material 28. Ignition of the booster material results in the rupturing of any seal(s) blocking booster cup orifice 25e and a flow of combustion products through orifice 25e and orifice plate 25, and into inner housing interior cavity 22c, igniting gas generant 60. Ignition of gas generant 60 results in a relatively rapid generation of combustion products and an increase in pressure within the inner housing, producing rupture of the seals covering inner housing openings 22d.

The combustion products flow out of the inner housing through openings 22d and into the portion(s) of the housing interior containing the liquid coolant, passing through and mixing with the liquid coolant as they flow from inner housing 22 toward second end closure 16. As the gases flow through the housing interior, heat is transferred from the gases to the coolant, thereby cooling the gases. In a particular embodiment, the gas generating system is designed and the coolant amount and composition is specified such that heat transferred from the gases changes the phase of the coolant from liquid to vapor (or, in the event a combustible liquid coolant is used, ignites the coolant), producing additional molar inflation gas output for filling an associated inflatable device (not shown). As the pressure within outer housing 12 increases, the seal covering opening 16f in second end closure passage 16e is ruptured, releasing the generated gases and vapor to fill an associated inflatable device.

In addition, the evaporated liquid coolant can act as an airbag release agent. In instances where an airbag is to be inflated and the liquid coolant used is water or water-based, humidification or introduction of water vapor (from evaporation of the coolant by the generated gases) reduces the pressure required to release and inflate an airbag in fluid communication with the gas generating system. The water vapor functions to lubricate the airbag opening resulting in improved vehicle restraint performance and a "break" in the airbag at a lower pressure than would be the case for a gas generating system not employing the liquid coolant. Thus, the force of the airbag deployment is decreased given the reduction in "break", thereby enhancing occupant safety. The ideal airbag "break" is zero pressure. The term "break" is defined as the point the airbag releases and begins to inflate.

TABLE 1

ALL WITH 23.5 g COOLANT
(Potassium Acetate - Water mixture (50-50 by weight))

| | |
|---|---|
| 20 ms Tank Pressure (average) (kPa) | 75 |
| Peak Chamber Pressure (average) (MPa) | 55 |
| Coolant Chamber Level (% full) | 46% |
| Coolant Chamber Volume (cc) | 40.1 cc |
| Coolant Volume (cc) | 18.4 cc |

Referring to FIG. 1 and Table 1, three samples were prepared in accordance with the embodiment shown in FIG. 1. The coolant in each sample comprised a mixture of 50% by weight of potassium acetate and 50% by weight of water. The coolant chamber volume is defined as the calculated or measured portion of the gas generating system internal volume available for storage of the liquid coolant. The coolant chamber level is defined as the ratio of the coolant volume (i.e., the volume occupied by the coolant) to the coolant chamber volume.

Each of the samples contained an equal amount of gas generant material, used the same model of initiator, and incorporated the same internal components and features as previously described. In addition, the same amount of coolant was used in each sample.

Each of the sample gas generating systems was activated, and the variation of tank pressure over time and chamber pressure over time for each sample was recorded. As used herein, the term "chamber pressure" is defined as the pressure within the system outer housing, and the term "tank pressure" is defined as the pressure inside a test tank with which the gas generating system is in fluid communication, and which receives the gases generated and output by the gas generating system.

The tank pressure and peak chamber pressure were measured for each sample at approximately 20 milliseconds after activation.

It is believed that, as generated gases exit the inner housing through apertures 22d, the coolant directly in front of the apertures absorbs heat from the gases and begins phase change from liquid to vapor. As the gases travel through the inflator with the coolant, the inflator components absorb some heat from the gases.

In the embodiment of FIG. 1, as a relatively greater number of the gas exit apertures 22d along inner housing 22 are covered by the liquid coolant, the higher chamber pressures measured for the samples embodying FIG. 1 are believed to be caused by higher backpressures due to the initial blockage of more of the gas exit orifices by the coolant.

However, it is believed that coolant initially positioned toward the first end 12a of outer housing 12 (i.e., out of the flow path of gases toward housing second end 12b) absorbs the heat from the relatively lower chamber pressure combustion of the gas generant and from the heated system structural components. As a result, a portion of this coolant changes phase. In the embodiment shown in FIG. 1, as a relatively smaller amount of coolant initially resides outside the gas flow path, it is believed that less coolant is available for delayed heating and evaporation. Thus, it is believed that heating and evaporation of this additional material provides higher inflation pressures for a longer period of time.

EXAMPLE 1

Two inflators manufactured as shown in FIG. 1 were loaded with about 25.5 grams of a gas generant containing 66.135% ammonium nitrate, 7.348% potassium nitrate, 26.017% of bis-(1(2) H-tetrazol-5-yl)-amine, 0.25% silica, and 0.25% graphite, the percents stated by weight. The composition was prepared as described in co-owned U.S. Pat. No. 6,210,505, herein incorporated by reference. One inflator had a coolant loaded in the housing 12 outside of the combustion chamber 22. The coolant contained 50% potassium acetate, 49% water, and 1% rust inhibitor, the percents stated by weight. Each inflator was activated and the gases shunted into an associated airbag. As measured by a strain gage pressure transducer, the data in FIG. 2 indicates that the system incorporating liquid coolant resulted in an internal bag pressure at 6 seconds of about 21 kPa, while the system without the liquid coolant resulted in an internal bag pressure at 6 seconds of about 9 kPa. Thus, the system incorporating liquid coolant had an internal sustained airbag pressure that was approximately 233% higher than the system without the liquid coolant. Based on these measurements and on laboratory analysis, it is believed that the bag internal pressure at a time of 6 seconds after system activation is an indication of the effect of the heating and vaporization of the coolant, which provides additional bag inflation fluid. Furthermore, as shown below, the pressure benefit is realized while simultaneously reducing the temperature of the exit gases due to the cooling effect of the coolant.

EXAMPLE 2

One inflator manufactured as shown in FIG. 1 was loaded with about 6.5 grams of a gas generant containing 66.135% ammonium nitrate, 7.348% potassium nitrate, 26.017% of bis-(1(2) H-tetrazol-5-yl)-amine, 0.25% silica, and 0.25% graphite, the percents stated by weight. Two other inflators designed as known side impact inflators contained 7.0 grams each of a gas generant composition containing 59.896% ammonium nitrate, 6.544% potassium nitrate, 25.8% of diammonium salt of 5,5'-Bi-1H-tetrazole, 7.46% strontium nitrate, and 1.3% clay, the percents stated by weight. The compositions were prepared as described in co-owned U.S. Pat. No. 6,210,505, herein incorporated by reference. The inflator designed as shown in FIG. 1 had a coolant loaded in the housing 12 outside of the combustion chamber 22. The coolant contained 50% potassium acetate, 49% water, and 1% rust inhibitor, the percents stated by weight. The inflators were activated and the gases were shunted into a 60 L tank. As measured by a strain gage pressure transducer, the peak pressure of the cooled inflator gases was substantially equivalent to the pressure of the uncooled gases, at about 70-75 kpa. The temperature of the cooled inflator gases however, was substantially less than the temperature of the uncooled gases, by about 150-200 degrees Celsius.

In the embodiment shown in FIG. 3, the liquid media is provided in a chamber formed proximate an end of the gas generant housing. Gas generating system 410 includes a housing 412 with first and second end closures 414, 416 secured to opposite ends of the housing known methods (such as crimping) to provide a substantially gas-tight seal at each end of the housing. The seals may be provided by, for example, O-rings or other known gaskets or seals. One or more openings 412d are provided in a wall of the housing to enable fluid communication between an interior of the housing and an exterior of the housing. Openings 412d are sealed prior to activation of the gas generating system, using a known burstable membrane material capable of preventing undesired leakage of a liquid coolant media (described below) from a chamber 499 formed within the housing. The membrane material is also burstable in response to the heat and/or pressure and/or flow of combustion gases generated by combustion of a gas generant 460 (described below) positioned within the housing. Housing 412 is made from a metal or metal alloy and may be a cast, drawn, extruded, or otherwise metal-formed. End closures 414 and 416 may be stamped, die cast, or otherwise metal formed and may be made from carbon steel or stainless steel, for example. Alternatively, the end closures may be molded or otherwise formed from a suitable polymer, ceramic, or other material.

Referring again to FIG. 3, an igniter assembly 444 is positioned and secured within end closure 414 so as to enable fluid communication between a cavity 446 containing an associated ignition compound 448 (described in greater detail below), and an igniter 444a incorporated into the igniter assembly for igniting the ignition compound 448 upon activation of the gas generating system. Igniter assembly 444 may be secured in end closure 414 using any one of several known methods, for example, by welding, crimping, using an interference fit, or by adhesive application. Igniter assemblies suitable for the application described herein may be obtained from any of a variety of known sources, for example Primex Technologies, Inc. of Redmond, Wash. or Aerospace Propulsion Products bv, of The Netherlands. Igniter 444a may he formed as known in the art. Exemplary igniter constructions are described in U.S. Pat. Nos. 6,009,809 and 5,934,705, incorporated herein by reference. Igniter 444a may be secured within igniter assembly 444 by any one of a variety of methods, for instance using welds, adhesives, by crimping, or by integrally molding the igniter into a portion of the igniter assembly.

An orifice plate 490 is configured to channel (and optionally, to regulate) a flow of gases resulting from combustion of booster material 449. In the embodiment shown in FIG. 3, orifice plate 490 is generally cup-shaped and has a base portion, a wall extending from a periphery of the base portion, and a flange extending radially outwardly from the wall. The flange is configured to abut end closure 414, thereby enclosing cavity 446. However, plate 490 can be flat or bent or formed to any other desired configuration according to the needs of a particular application. One or more orifices are formed in the orifice plate base portion, enabling fluid communication between cavity 446 and gas generant material 460.

Referring again to FIG. 3, a quantity of an ignition compound 448 is contained within cavity 446. In the embodiment shown in FIG. 3, ignition compound 448 is a known or suitable ignition or booster material, whose combustion ignites main gas generant charge 460. One or more autoignition tablets (not shown) may be placed in booster cavity 446, allowing ignition of ignition compound 448 upon external heating of the gas generating system, in a manner well-known in the art.

Referring again to FIG. 3 a washer-like, pad cushion 470 formed from, for example, a ceramic fiber material is provided for holding the gas generant material 460 in place and for cushioning the gas generant against vibration and impact. Cushion 470 is porous or contains at least one orifice formed therein to enable fluid communication between the orifice plate orifices and gas generant 460.

Referring again to FIG. 3, a gas generant enclosure comprising a sleeve 436 is positioned within housing 412 to define a combustion chamber for the gas generant. Sleeve 436 has an inner diameter dimensioned so as to engage orifice plate 490 in a slip or interference fit.

Gas generant material 460 is positioned within housing 412 for production of gases upon ignition thereof. In the embodiment shown, gas generant 460 is in the form of a plurality of annular wafers stacked along at least a portion of the housing interior. It will be appreciated that other, alternative arrangements of the gas generant composition may be used. For example, sleeve 436 may be partially or completely filled with a gas generant in granulated or tablet form. Both ignition compound 448 and gas generant material 460 may be formulated by known methods, and are exemplified by, but not limited to, those described in U.S. Pat. Nos. 5,035,757, 6,210,505, 6,620,266, 5,872,329, 5,756,929, and 5,386,775, all herein incorporated by reference. Alternative compositions may also be used, according to the needs of a particular application.

Referring to FIG. 3, a bulkhead 450 is positioned within housing 412 spaced apart from second end closure 416, thereby forming a chamber 499 for storing therein a liquid coolant media 400 (described below). Bulkhead 450 is positioned and secured within housing 412 using a method (for example, roll-crimping) suitable to form a substantially gas tight seal between the bulkhead and housing 412. One or more orifices are provided in bulkhead 450 to enable fluid communication between the interior of sleeve 436 the liquid coolant media 400 in chamber 499. The orifices are sealed prior to activation of the gas generating system, using a known burstable membrane material capable of preventing undesired leakage of the liquid coolant media from chamber 499. The membrane material is also burstable in response to the heat and/or pressure and/or flow of combustion gases generated by combustion of gas generant 460. Bulkhead 450 may be made from a metal or metal alloy with a relatively high thermal conductivity.

Operation of the gas generating system of FIG. 3 will now be discussed. Upon receipt of a signal from a crash sensor, an electrical activation signal is sent to igniter 444a. Combustion products from the igniter expand into cavity 446, igniting booster compound 448 positioned in booster cavity 446. Products from the combustion of booster compound 348 proceed out of cavity 446 through the orifices in plate 490 to ignite gas generant material 460. Gas generant 460 combusts, generating heat which is transferred via conduction through thermally conductive bulkhead 450 to coolant and vaporization media 400, causing the media to boil and then vaporize. In addition, combustion products such as hot gas, flame, and hot solids proceed through the bulkhead orifices, rupturing the sealing membranes positioned over the orifices. The gases then enter chamber 499 and flow through coolant media 400 before proceeding to exit the gas generating system housing (along with vaporized media) through the ruptured membranes that covered orifices 412d in the housing wall. The generated gases are cooled and slag is removed from the gases during passage of the gases through the liquid coolant media. Thus, the media both cools the generated gases, provides a measure of filtering of the gases, and provides additional material usable for filling an inflatable device.

If desired a conventional filter (not shown) may be incorporated into the system for the removal of slag and particulates. The filter is positioned along a flow path of generated gases between the interior of sleeve 436 and media storage chamber 499.

In another operational mode, rapid vaporization of the media increases the pressure within the coolant storage chamber, and the seals leading to the exterior of the gas generating system are ruptured by vaporized media. The vaporized media and combustion gases then proceed to exit the gas generating system housing through the orifices in the housing wall.

Figure 2:
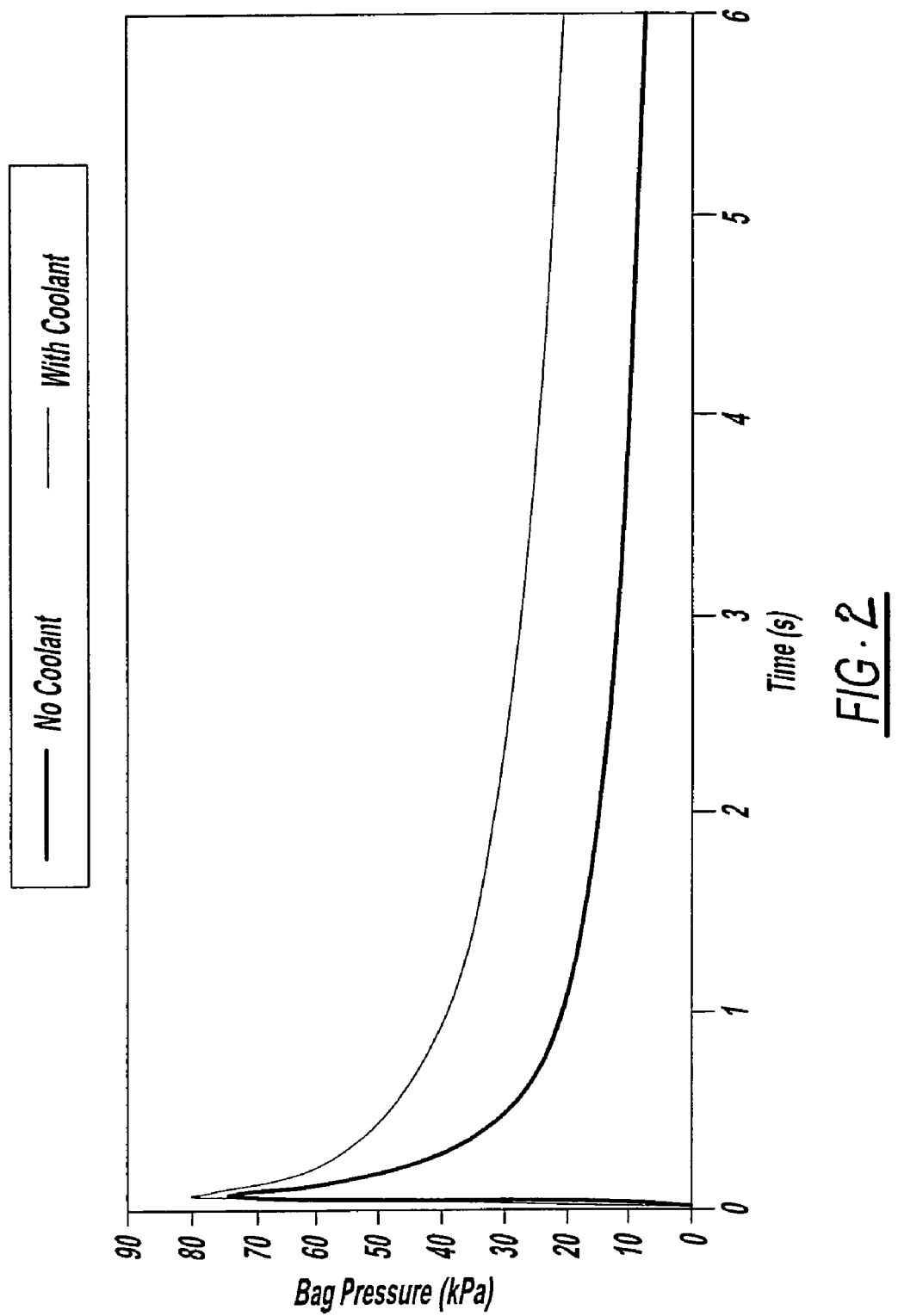
FIG. 2 is a graphical representation of the variation of pressure over time in an inflatable device inflated using a gas generating system in accordance with the embodiment shown in FIG. 1 and incorporating a liquid coolant, and in an inflatable device inflated using a gas generating system in accordance with the embodiment shown in FIG. 1 without liquid coolant.

As explained previously, it is believed that the heat of gas generant combustion and intermixing of the coolant with generated gases causes a substantial portion of the coolant to be ejected from the housing as an aerosol or vapor. It is believed that this feature can be used to affect the inflation profile of an inflatable device operatively coupled to the gas generating system. It is believed that a greater fill pressure can be sustained over a given time period using a combination of combustion gases and evaporated media, as shown in the present invention. As shown in FIG. 2, it is believed that a much higher internal pressure is sustainable over a given time period using a system in accordance with an embodiment of the present invention. This is especially useful in applications (such as airbags for vehicle rollover applications) requiring a sustained high-pressure supply of fluid.

In another embodiment, the liquid media forms a jacket enclosing a gas generant combustion chamber, from which combustion heat is transferred to the liquid. FIG. 4 shows this embodiment of the gas generating system. Gas generating system 310 includes a housing 312 with first and second end closures 314, 316 secured to opposite ends of the housing known methods (such as crimping) to provide a substantially gas-tight seal at each end of the housing. The seals may be provided by, for example, O-rings or other known gaskets or seals. One or more openings 312*d* are provided in a wall of the housing to enable fluid communication between an interior of the housing and an exterior of the housing. Openings 312*d* are sealed prior to activation of the gas generating system, using a known burstable membrane material capable of preventing undesired leakage of a liquid coolant media (as previously described) from the housing. The membrane material is also burstable in response to the heat and/or pressure and/or flow of combustion gases generated by combustion of a gas generant 360 (described below) positioned within the housing. Housing 312 is made from a metal or metal alloy and may be a cast, drawn, extruded, or otherwise metal-formed. End closures 314 and 316 may be stamped, die cast, or otherwise metal formed and may be made from carbon steel or stainless steel, for example. Alternatively, the end closures may be molded or otherwise formed from a suitable polymer, ceramic, or other material.

A gas generant enclosure or inner housing 320 is positioned and secured within housing 312 spaced apart from the walls of housing 312 to form a substantially annular cavity 390 between enclosure 320 and housing 312. In the embodiment shown in FIG. 4, enclosure 320 includes a second housing 322 with an end closure 324 secured to an end of the housing known methods (such as crimping) to provide a substantially gas-tight seal at the end of housing 322. The seal may be provided by, for example, O-rings or other known gaskets or seals. One or more openings 322*d* are provided in a wall of the second housing to enable fluid communication between an interior of the housing and cavity 390. Openings 322*d* are sealed prior to activation of the gas generating system, using a known burstable membrane material capable of preventing undesired leakage of the liquid coolant media from the housing. The membrane material is also burstable in response to the heat and/or pressure and/or flow of combustion gases generated by combustion of gas generant 360 positioned within second housing 322. In the embodiment shown in FIG. 4, second housing openings 322*d* are in alignment with openings 312*d* formed in housing 312. This enables rapid ejection of gases generated by combustion of gas generant 360 from housing 312 and into an associated inflatable element. Second housing 322 is made from a metal or metal alloy having a relatively high thermal conductivity, and may be drawn, extruded, or otherwise metal-formed. End closure 324 may be stamped, die cast, or otherwise metal formed and may be made from carbon steel or stainless steel, for example.

Alternatively, the end closure may be molded or otherwise formed from a suitable polymer, ceramic, or other material.

Referring again to FIG. 4, an igniter assembly 344 is positioned and secured within end closure 324 so as to enable fluid communication between a cavity 346 containing an associated ignition compound 348 (described in greater detail below), and an igniter 344*a* incorporated into the igniter assembly for igniting the ignition compound 348 upon activation of the gas generating system. Igniter assembly 344 may be secured in end closure 324 using any one of several known methods, for example, by welding, crimping, using an interference fit, or by adhesive application. Igniter assemblies suitable for the application described herein may be obtained from any of a variety of known sources, for example Primex Technologies, Inc. of Redmond, Wash. or Aerospace Propulsion Products bv, of The Netherlands. Igniter 344*a* may be formed as known in the art. Exemplary igniter constructions are described in U.S. Pat. Nos. 6,009,809 and 5,934,705, incorporated herein by reference. Igniter 344*a* may be secured within igniter assembly 344 by any one of a variety of methods, for instance using welds, adhesives, by crimping, or by integrally molding the igniter into a portion of the igniter assembly.

An orifice plate 391 is configured to channel (and optionally, to regulate) a flow of gases resulting from combustion of booster material 348. In the embodiment shown in FIG. 4, orifice plate 391 is generally cup-shaped and has a base portion, a wall extending from a periphery of the base portion, and a flange extending radially outwardly from the wall. The flange is configured to abut end closure 324, thereby enclosing cavity 346. However, plate 391 can be flat or bent or formed to any other desired configuration according to the needs of a particular application. One or more orifices are formed in the orifice plate base portion, enabling fluid communication between cavity 346 and gas generant material 360.

Referring again to FIG. 4, a quantity of an ignition compound 348 is contained within cavity 346. In the embodiment shown in FIG. 4, ignition compound 348 is a known or suitable ignition or booster compound, whose combustion ignites main gas generant charge 360. One or more autoignition tablets (not shown) may be placed in booster cavity 346, allowing ignition of ignition compound 348 upon external heating of the gas generating system, in a manner well-known in the art.

Gas generant material 360 is positioned within second housing 322 for production of gases upon ignition thereof. In the embodiment shown, gas generant 360 is in the form of an annular grain suspended between end portions of the second housing. It will be appreciated that other, alternative arrangements of the gas generant composition may be used. For example, second housing 322 may be partially or completely filled with a gas generant in granulated, tablet, or wafer form. Both ignition compound 348 and gas generant material 360 may be formulated by known methods, and are exemplified by, but not limited to, those described in U.S. Pat. Nos. 5,035,757, 6,210,505, 6,620,266, 5,872,329, 5,756,929, and 5,386,775, all herein incorporated by reference. Alternative compositions may also be used, according to the needs of a particular application.

It will be appreciated that the ratio of solid propellant to coolant may vary depending on the design requirements of a particular application. Accordingly, it may be desirable to include less than one mol of gas generant per mol of coolant to result in a relatively cooler effluent. On the other hand, it may be desirable to include more than one mol of gas generant per mol of coolant to result in a relatively warmer effluent.

It will also be appreciated that the heat of combustion of any given propellant will be considered relative to the total moles of coolant required for a given design criteria. Accordingly, to illustrate, the ratio of a gas generant 360 having a relatively higher heat of combustion to the coolant 301 might be smaller than the ratio of a gas generant 360 having a relatively lower heat of combustion to the coolant 301, for the same thermal requirements on an associated airbag for example.

Accordingly, although not hereby limited, the ratio of gas generant 360 to coolant 301 may vary from about 0.25 to 2.0 moles of gas generant 360 per 2 to 0.5 moles of coolant 301. More preferably the ratio of generant 360 to coolant 99 is about 0.5 to 1.5 moles of propellant 360 to 1.5 to 0.5 moles of coolant 301. In one embodiment the ratio is about one mol of propellant 360 to about 0.75 mol of aqueous coolant 301. The amount of coolant 301 desired as compared to the amount of solid propellant 360 required may be iteratively determined by trial and error depending on effluent requirements such as effluent quality and temperature. It will be appreciated that the heat capacity and the heat of vaporization of the coolant 301 may be evaluated with regard to the heat of combustion of the propellant 360, thereby optimizing the amounts of each constituent with respect to application requirements such as inflation pressure over time. The amount of solid propellant 360 is preferably determined by evaluating the inflation requirements and ensuring that the total gas generated by the solid propellant 360 meets those requirements. It should be appreciated that the inflator vessel must be metallurgically formed to withstand the potential affects of the saline coolant. The gas generator could for example, be formed from stainless steel, or other metals and alloys not corroded in the present of the saline solution 301.

As seen in the previously described embodiments, a liquid coolant and vaporization media 301 is provided in cavity 390 for absorbing heat from generated gases prior to the gases exiting the housing, and for supplying additional fill material for filing an inflatable device in fluid communication with the gas generating system. The coolant media can also serve as an additional filtration medium, for removing additional particulates from the generated gases.

Operation of the gas generating system of FIG. 4 will now be discussed. Upon receipt of a signal from a crash sensor, an electrical activation signal is sent to the igniter 344a. Combustion products from the igniter expand into cavity 346, igniting booster compound 348 positioned in booster cavity 346. Products from the combustion of booster compound 348 proceed out of cavity 346 through the orifices in plate 391 to ignite gas generant material 360. Gas generant 360 combusts, generating heat which is transferred via conduction through thermally conductive second housing 322 to coolant and vaporization media 100 in cavity 390, causing the media to boil and then vaporize. In addition, combustion products such as hot gas, flame, and hot solids rupturing the membranes sealing openings 322d and proceeding through the openings. The gases then enter cavity 390 and flow through coolant media 100 before proceeding to exit (along with vaporized media) the gas generating system housing through the ruptured membranes over orifices 312d in the wall of housing 312. The generated gases are cooled and slag is removed from the gases during passage of the gases through the liquid coolant media. Thus, the media both cools the generated gases, provides a measure of filtering of the gases, and provides additional material usable for filling an inflatable device.

If desired a conventional filter (not shown) may be incorporated into the system for the removal of slag and particulates. The filter is positioned along a flow path of generated gases between the interior of second housing 322 and media storage chamber 390.

In another operational mode, rapid vaporization of the media increases the pressure within the coolant storage chamber, and the seals leading to the exterior of the gas generating system are ruptured by vaporized media. The vaporized media and combustion gases then proceed to exit the gas generating system housing through the orifices in the housing wall.

Figure 5:
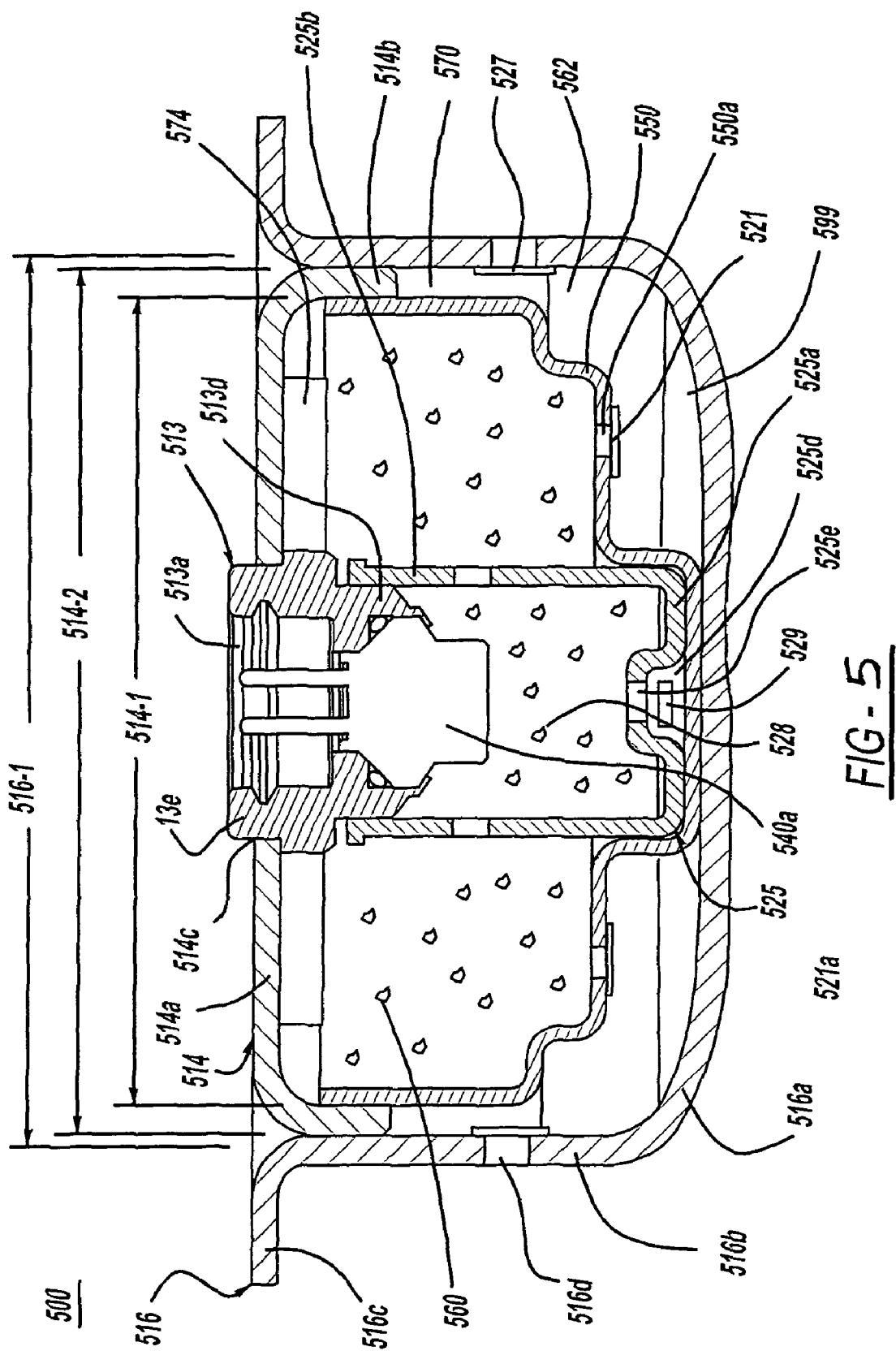
FIG. 5 is a cross-sectional side view of a gas generating system in accordance with another embodiment of the present invention.

FIGS. 5 and 6 show respective cross-sectional side views of gas generating systems in accordance with respective additional embodiments 500 and 610 of the present invention.

Referring to FIG. 5, gas generating system 500 includes a housing 512 having a base 514 and a cap 516. Cap 516 is generally cylindrical and has a base portion 516a, a wall 516b extending from the base portion, and a flange 516c extending outwardly from wall 516b. Wall 516b has an inner diameter 516-1. Flange 516c may have mounting or securement features (for example, holes) (not shown) formed therein to permit mounting of the gas generating system to a vehicle or other structure. At least one opening 516d is formed along cap wall 516b to permit fluid communication between an interior of the housing and an associated inflatable device (not shown).

Base 514 is generally cylindrical and has a body portion 514a and a wall 514b extending from the body portion. Wall 514b has an inner diameter 514-1 and an outer diameter 514-2. In the embodiment shown in FIG. 5, the base wall outer diameter and the cap inner diameter are dimensioned so as to form an interference fit between cap 516 and base 514 when base 514 is inserted into cap 516 as shown in FIG. 5. An opening 514c is formed in base body portion 514a for receiving therein a portion of a bore seal (described below). Base 514 and cap 516 may be secured to each other by a weld formed along a seam between the base and cap after insertion of the base into cap 516 as shown. Alternatively, any other suitable method (for example, adhesive application) may be used to secure the base to the cap. Housing base 514 and cap 516 may be stamped or otherwise formed from a metal, metal alloy, or other suitable material.

Referring to FIG. 5, each cap opening 516d is covered with a rupturable, gas-tight seal or shim 527 to seal the opening. Various disks, foils, films, or tapes (for example, aluminum or stainless steel shims, foil or tape) may be used to form the seal. The seal material is typically adhered to an interior surface of the cap wall through the use of an adhesive. Alternatively, other materials or methods may be used to seal openings 516d.

Referring again to FIG. 5, an end closure or bore seal 513 has a central orifice 513a configured for receiving therein a conventional initiator 540a for igniting an associated gas generant composition 560 and/or booster composition 528 stored in the gas generating system. A rim 513d extends around an end portion of bore seal central orifice 513a to enclose a portion of initiator 540a. A peripheral shoulder 513e is formed along an outer edge of the bore seal to enable positioning and securement of the bore seal along an edge of opening 514c formed in base 514. Bore seal 513 is secured within opening 514c by welding or any other means suitable for providing a substantially gas-tight seal which prevents generated gases from escaping from the base/bore seal interface. Bore seal 513 may be formed from a metal, metal alloy, or other suitable material using a suitable manufacturing process, such as casting and/or machining. In the embodiment shown in FIG. 5, bore seal 513 is mounted to a mouth of base opening 514c and suitably secured, using welding or other means.

An igniter or initiator 540a is secured to the gas generating system so as to enable fluid communication with an associated gas generant material 560 (described below) and/or an associated booster material 528 (also described below) upon activation of the gas generating system. In the embodiments shown in FIG. 5, igniter 540a is positioned and secured within a central orifice of bore seal 513 using any one of a variety of methods, for instance welding, adhesive application, crimping, or by integrally molding the igniter or a portion thereof into the bore seal. Initiator 540a may be formed as known in the art. Exemplary initiator constructions are described in U.S. Pat. Nos. 6,009,809 and 5,934,705, incorporated herein by reference.

Referring to FIG. 5, a gas generant container 550 is positioned within cap 516 for containing a quantity of a gas generant composition 560 therein. In the embodiment shown in FIG. 5, container 550 is generally cylindrical and has an outer diameter dimensioned to form an interference fit with the inner diameter of base wall 514b, producing a substantially gas-tight seal. Container 550 is spaced apart from cap wall 516c to form an annular gas flow passage 570 extending along container 550 between the container and housing cap wall 516b. One or more gas exit openings 550a are provided in container 550 to enable a flow of generated gases from an interior of the container to an exterior of the container after combustion of gas generant material 560 has been initiated. Container 550 may be stamped or otherwise formed from a metal, metal alloy, or other suitable material.

Each opening 650a in gas generant container 650 is covered with a rupturable, fluid-tight seal or shim 521 as previously described to seal the opening. Various disks, foils, films, or tapes (for example, aluminum or stainless steel shims, foil or tape) may be used to form the seal. The seal material is typically adhered to an interior surface of gas generant container through the use of an adhesive. Alternatively, other materials or methods may be used to seal openings 550a.

Referring to FIG. 5, a perforated cup 525 is positioned abutting bore seal 512 or otherwise within the gas generating system housing to enclose igniter 540a and to house booster propellant 528. In the embodiment shown in FIG. 5, cup 525 is generally cylindrical and has a base portion 525a and a wall 525b extending from the base portion. Wall 525b has an inner diameter and an outer diameter. The wall inner diameter and a portion of bore seal 512 are dimensioned so as to form an interference fit therebetween as shown in FIG. 5, thereby enabling a portion of the bore seal to be nested within an end of the booster cup. Cup wall 525b has one or more openings 525c formed therein to enable fluid communication between an interior of the cup and an exterior of the cup. In the embodiment shown in FIG. 5, cup base portion 525a and a base portion of gas generant container 550 are dimensioned to provide an interference fit therebetween, to aid in positioning and suspending the gas generant container radially inward of cap wall 512c. Cup base portion 525a has a pocket 525d formed to enable positioning of an auto-ignition material 529 therein. An orifice 525e is formed in booster cup 525 to enable fluid communication between pocket 525d and an interior of the cup containing booster composition 528. Cup 525 may be stamped, cast, drawn, or otherwise formed from carbon steel, stainless steel, or any other suitable material.

The perforated cup 525 allows passage of a flame front and combustion products generated by ignition of an associated booster material 528 to an exterior of the tube. Passage of these combustion products through the cup openings results in ignition of a gas generant positioned proximate the tube and production of an inflating gas.

Referring to FIG. 5, a quantity of a known booster material 528 is positioned within housing 515 so as to enable fluid communication between by-products of booster material combustion and gas generant composition 560 after the onset of booster material combustion. Activation of igniter 540a produces combustion of the booster material, thereby facilitating ignition of gas generant composition 560 in a manner known in the art. In the embodiment shown in FIG. 5, booster material 528 is positioned within booster cup 525.

A quantity of a known heat-activated auto-ignition material 529 as previously described may be positioned within the gas generating system so as to enable fluid communication between the auto-ignition material and an associated gas generant material 560 and/or an associated booster material 528 upon activation of the gas generating system. In the embodiment shown in FIG. 5, auto-ignition material 529 is positioned within booster cup pocket 525d.

Referring to FIG. 5, each opening 525c in cup 525 is covered with a rupturable, fluid-tight seal or shim 521a to seal the opening. Various disks, foils, films, or tapes (for example, aluminum or stainless steel shims, foil or tape) may be used to form the seal. The seal material is typically adhered to a surface of cup 525 through the use of an adhesive. Alternatively, other materials or methods may be used to seal openings 525c.

Referring again to FIG. 5, a quantity of a gas generant composition 560 is contained within gas respective generant container 550 for production of gases after gas generating system activation. Gas generant 560 may be in any of a variety of forms, for example tablets, stacked wafers, or in granulated form. Gas generant material 560 may be formulated by known methods, and in one embodiment is exemplified by "smokeless" gas generant compositions as described in U.S. Pat. Nos. 5,872,329, 6,074,502, 6,287,400, 6,306,232 and 6,475,312 incorporated by reference herein. As used herein, the term "smokeless" should be generally understood to mean such propellants as are capable of combustion yielding at least about 90% gaseous products based on a total product mass; and, as a corollary, no more than about 10% solid products based on a total product mass. However, the present invention is not limited to the use of smokeless gas generant compositions therein. In the embodiment shown in FIG. 5, gas generant 560 is in the form of granules.

An annular washer-like, pad or cushion 574 formed from, for example, a ceramic fiber material, is provided for holding the gas generant in place and/or for cushioning the gas generant against vibration and impact.

Referring again to FIG. 5, in the embodiment shown therein, a filter 562 is positioned within housing 512 for filtering particulates from gases generated by combustion of gas generant 560. In general, filter 562 is positioned between gas generant 560 and cap gas exit openings 516d. In the embodiment shown in FIG. 5, filter 560 is an annular filter positioned adjacent gas generant container and covering container gas exit openings 550a. The filter may be formed from any of a variety of materials (for example, a carbon fiber or metallic mesh or perforated sheet, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J.

Referring again to FIG. 5, a liquid coolant 599 as previously described resides in an interior of housing 512 along a flow path of combustion gases between gas generant container 550 and housing gas exit apertures 516d. In the embodiment shown in FIG. 5, liquid coolant 599 occupies substantially all the space in the interior of housings 512 that is exterior of gas generant container 550 and that is not otherwise occupied by other components of the respective gas generating systems. Alternatively, the coolant may be confined within one or more dedicated enclosures (not shown) configured and positioned to enable fluid communication (via gas generant container openings 550a) between the coolant in the interior of the housing and gases generated by combustion of gas generants 560 after activation of the respective gas generating system.

Operation of the gas generating system will now be discussed with reference to FIG. 5.

Upon receipt of a signal from a crash sensor, an electrical activation signal is sent to igniter 540a, which ignites to initiate combustion of booster material 528. Ignition of the booster material results in the rupturing of any seal(s) covering booster cup orifice(s) 525c and produces a flow of combustion products into gas generant container 550, igniting gas generant 560. Ignition of gas generant 560 results in a relatively rapid generation of combustion gases in the interior of container 550 which impinge upon any seal covering container openings 550a, producing rupturing of the seal. The gases then flow into the portion of the housing interior containing the liquid coolant, passing through and mixing with the liquid coolant as they flow from container 550 toward housing gas exit openings 516d in cap 516. As the gases flow through the housing interior, heat is transferred from the gases to the coolant, thereby cooling the gases. Simultaneously, heat transferred from the gases changes the phase of the coolant from liquid to vapor, producing additional molar inflation gas output for filling an associated inflatable device (not shown). The seals covering openings 516d in housing cap 516 are ruptured by an increase in interior housing pressure and/or by other means, releasing the generated gases and vapors to fill an associated inflatable device.

Referring to FIG. 6, another embodiment 600 of the gas generating system includes a housing 612 having a base 614 and a cap 616. In the embodiment shown in FIG. 6, base 614 includes a body portion 614a, a peripheral wall 614b extending from the base portion, and a central cavity 614c extending into the base portion for storing a booster propellant 628 and, if desired, an auto-ignition material 629 therein. Cavity 614c extends into housing cap 616 when the gas generating system is assembled. A wall of the body portion defining cavity 614c contains at least one orifice 614e formed therein to enable fluid communication between an interior of the cavity and an interior of a gas generant container 650 (described below) containing a gas generant composition 660. Base wall 614b has an outer diameter 614-1. In the embodiment shown in FIG. 6, the base wall outer diameter and an inner diameter 650-1 of gas generant container 650 are dimensioned so as to form an interference fit between the base wall and the gas generant container when base 614 is inserted into the gas generant container as shown in FIG. 6.

Each opening 650a in gas generant container 650 is covered with a rupturable, fluid-tight seal or shim 651 shown) as previously described to seal the opening. Alternatively, other materials or methods may be used to seal openings 650a.

Referring to FIG. 6, a quantity of a known booster material 628 as previously described is positioned within housing 612 so as to enable fluid communication between by-products of booster material combustion and gas generant composition 660 after the onset of booster material combustion. In the embodiment shown in FIG. 6, booster material 628 is positioned within base portion cavity 614c.

In the embodiment shown in FIG. 6, an auto-ignition material 629 as previously described is positioned within base portion cavity 614c.

Referring to FIG. 6, a gas generant container 650 similar to that shown in FIG. 6 is positioned within cap 616 for containing a quantity of a gas generant composition 660 therein. In the embodiment shown in FIG. 6, container 650 is generally cylindrical and has an outer diameter dimensioned to form an interference fit with the inner diameter of base wall 614b, producing a substantially gas-tight seal. One or more gas exit openings 650a are provided in container 650 to enable a flow of generated gases from an interior of the container to an exterior of the container after combustion of gas generant material 660 has been initiated. Container 650 may be stamped or otherwise formed from a metal, metal alloy, or other suitable material.

Each opening 650a in gas generant container 650 is covered with a rupturable, fluid-tight seal or shim (not shown) as previously described to seal the opening. Alternatively, other materials or methods may be used to seal openings 650a.

A quantity of a gas generant composition 660 as previously described is contained within gas generant container 650 for production of gases after gas generating system activation. In the embodiment shown in FIG. 6, gas generant 660 is in the form of stacked wafers.

Referring again to FIG. 6, a liquid coolant 699 as previously described resides in an interior of housing 612 along a flow path of combustion gases between respective gas generant container 650 and housing gas exit apertures 616d. In the embodiments shown in FIG. 6, liquid coolant 699 occupies substantially all the space in the interior of housing 612 that is exterior of respective gas generant container 650 and that is not otherwise occupied by other components of the respective gas generating systems. Alternatively, the coolant may be confined within one or more dedicated enclosures (not shown) configured and positioned to enable fluid communication (via gas generant container openings 650a) between the coolant in the interior of the respective housing and gases generated by combustion of gas generants 660 after activation of the respective gas generating system.

Coolant 99 may be any liquid substance (for example, water) which is capable of cooling the generated gases to the desired degree, and (if desired) which is vaporizable upon exposure to the generated gases and other combustion products, to provide an additional volume of inflation fluid according to the needs of a particular application.

Operation of the embodiment shown in FIG. 6 is substantially similar to that of the embodiment shown in FIG. 5.

Referring to FIG. 7, in one possible application of the gas generating system described herein, an embodiment of the gas generating system is incorporated into an airbag system 800. Airbag system 800 includes at least one airbag 900 and a gas generating system in accordance with one of the embodiments 500, 610 described herein and coupled to the airbag so as to enable fluid communication with an interior of the airbag upon activation of the gas generating system. Although a system incorporating one of embodiments 500, 610 is described in this portion of the specification, it is understood that gas generating systems incorporating embodiments 10, 310, and/or 410 could be incorporated into the system shown in FIG. 7, or into a similar system. System 800 may be in communication with a crash event sensor 810 that includes (or is in operative communication with) a crash sensor algorithm (not shown) which signals activation of airbag system 800 via, for example, activation of an igniter (not shown in FIG. 7) in the event of a collision.

Referring again to FIG. 7, an embodiment of the gas generating system or an airbag system including an embodiment of the gas generating system may be also incorporated into a broader, more comprehensive vehicle occupant protection system 880 including additional elements such as a safety belt assembly 850. Safety belt assembly 850 includes a safety belt housing 852 and a safety belt 860 extending from housing 852. A safety belt retractor mechanism 854 (for example, a spring-loaded mechanism) may be coupled to an end portion of the belt. In addition, a safety belt pretensioner 856 may be coupled to belt retractor mechanism 854 to actuate the retractor mechanism in the event of a collision. Typical seat belt retractor mechanisms which may be used in conjunction with safety belt 860 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 825 may be combined are described in U.S. Pat. Nos. 6,505,790 and 6,419,177, incorporated herein by reference.

Safety belt assembly 850 may be in communication with a crash event sensor 858 (for example, an inertia sensor or an accelerometer) that includes (or is in operative communication with) a crash sensor algorithm (not shown) which signals actuation of belt pretensioner 856 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be appreciated that the various constituents described above are formed in known manners. For example, the various components may be molded. stamped or otherwise metal formed from carbon steel, aluminum, metallic alloys, or any of a variety of polymers.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generating system comprising:
 a gas generant material for generating gases upon combustion thereof;
 an annular plenum surrounding said gas generant;
 an amount of liquid coolant for cooling gases generated in the gas generating system, and
 a filter configured for filtering a mixture of gas generant combustion products and liquid coolant.

2. The gas generating system of claim 1 wherein the coolant comprises water.

3. The gas generating system of claim 1 wherein the coolant comprises a saline solution.

4. The gas generating system of claim 3 wherein the coolant comprises about 50% by weight of potassium formate and about 49% by weight of water.

5. The gas generating system of claim 3 wherein the coolant includes potassium acetate.

6. The gas generating system of claim 5 wherein the coolant comprises about 50% by weight of potassium acetate, about 49% by weight of water, and about 1% by weight of a rust inhibitor.

7. The gas generating system of claim 1 wherein the coolant has a freezing point of less than −40° C.

8. The gas generating system of claim 1 wherein the coolant has a boiling point of greater than 107° C.

9. The gas generating system of claim 1 wherein the coolant is non-combustible.

10. The gas generating system of claim 1 wherein the coolant does not form a toxic substance when evaporated.

11. The gas generating system of claim 1 wherein the gas generant material and liquid coolant are positioned within a housing operatively coupled to a gas-actuatable device which receives generated gases from the housing to actuate the device,
 wherein cooling of the generated gases evaporates at least a portion of the coolant, and
 wherein at least a portion of the evaporated coolant is conveyed to the gas-actuatable device.

12. The gas generating system of claim 1 further comprising a housing and a gas generant enclosure positioned within the housing and spaced apart from the outer housing to form a cavity between the housing and the gas generant enclosure, and wherein the coolant is positioned within the cavity.

13. The gas generating system of claim 1 wherein said annular plenum is vacant.

14. The gas generating system of claim 1 wherein said annular plenum contains said coolant.

* * * * *

UNITED STATES PATENT AND TRADEMARK OFFICE
CERTIFICATE OF CORRECTION

| | | |
|---|---|---|
| PATENT NO. | : 8,123,878 B1 | Page 1 of 1 |
| APPLICATION NO. | : 12/156611 | |
| DATED | : February 28, 2012 | |
| INVENTOR(S) | : Krupp et al. | |

It is certified that error appears in the above-identified patent and that said Letters Patent is hereby corrected as shown below:

IN THE SPECIFICATIONS:

Column 8, Line 56;    Insert --using-- before known.

Column 11, Line 20;    Insert --using-- before known.

Column 11, Line 46;    Insert --using-- before known.

Signed and Sealed this
Twelfth Day of June, 2012

David J. Kappos
*Director of the United States Patent and Trademark Office*